United States Patent
Ishikawa

(10) Patent No.: US 7,903,095 B2
(45) Date of Patent: Mar. 8, 2011

(54) INFORMATION PROCESSING DEVICE, CONTROL METHOD FOR INFORMATION PROCESSING DEVICE, AND INFORMATION STORAGE MEDIUM

(75) Inventor: Hirotaka Ishikawa, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 805 days.

(21) Appl. No.: 11/885,427

(22) PCT Filed: Feb. 7, 2006

(86) PCT No.: PCT/JP2006/302032
§ 371 (c)(1),
(2), (4) Date: Aug. 31, 2007

(87) PCT Pub. No.: WO2006/092933
PCT Pub. Date: Sep. 8, 2006

(65) Prior Publication Data
US 2008/0158200 A1    Jul. 3, 2008

(30) Foreign Application Priority Data
Mar. 2, 2005    (JP) ................. 2005-057081

(51) Int. Cl.
*G09G 5/00* (2006.01)
*G06F 3/041* (2006.01)
(52) U.S. Cl. .......... 345/173; 345/156; 345/169; 345/179
(58) Field of Classification Search ............ 345/73–181, 345/1.1, 1.2, 1.3
See application file for complete search history.

(56) References Cited

U.S. PATENT DOCUMENTS

| | | | |
|---|---|---|---|
| 5,764,222 A | 6/1998 | Shieh | |
| 6,259,436 B1 * | 7/2001 | Moon et al. | 345/173 |
| 6,958,749 B1 | 10/2005 | Matsushita | |
| 7,345,675 B1 * | 3/2008 | Minakuchi et al. | 345/173 |
| 7,394,459 B2 * | 7/2008 | Bathiche et al. | 345/175 |

FOREIGN PATENT DOCUMENTS

| | | |
|---|---|---|
| JP | 10-40012 A | 2/1998 |
| JP | 2000-231438 A | 8/2000 |
| JP | 2001-34416 A | 2/2001 |
| JP | 2001-134382 A | 5/2001 |

* cited by examiner

*Primary Examiner* — Duc Q Dinh
(74) *Attorney, Agent, or Firm* — Sughrue Mion, PLLC

(57) ABSTRACT

An information processing device in which, when one position on a touch panel is newly pressed in a state in which another position or a plurality of other positions are pressed, the newly pressed position can be reliably specified. A pressed-position-information storing section (70) stores positional information indicating a plurality of positions of a touch panel section (56). Based on a position having a predetermined relationship with the plurality of positions indicated by the positional information that is stored in the pressed-position-information storing section (70), a display limiting section (78) limits a display positions of one or a plurality of position guiding images displayed on a display section (80). A pressed-position acquiring section (74) acquires a pressed position based on the plurality of positions indicated by the positional information stored in the pressed-position information storing section (70) and a position indicated by pressed position information outputted from the touch panel section (56). A processing executing section (76) executes processing based on the pressed position acquired by the pressed-position acquiring section (74).

9 Claims, 10 Drawing Sheets

FIG.10

| (xa, ya) |
| (xb, yb) |
| (xc, yc) |

FIG.11

| AREA ID | X COORDINATE | Y COORDINATE |
|---|---|---|
| 1 | $0 \leqq x < X1$ | $0 \leqq y < Y1$ |
| 2 | $X1 \leqq x < X2$ | $0 \leqq y < Y1$ |
| 3 | $X2 \leqq x < X3$ | $0 \leqq y < Y1$ |

FIG.12

| ID | POSITION COORDINATES | MOVING PATH | STATE FLAG |
|---|---|---|---|
| 1 | (x1, y1) | ... | 2 |
| 2 | (x2, y2) | ... | 1 |
| 3 | (x3, y3) | ... | 0 |
| 4 | (x4, y4) | ... | 0 |
| 5 | (x5, y5) | ... | 0 |

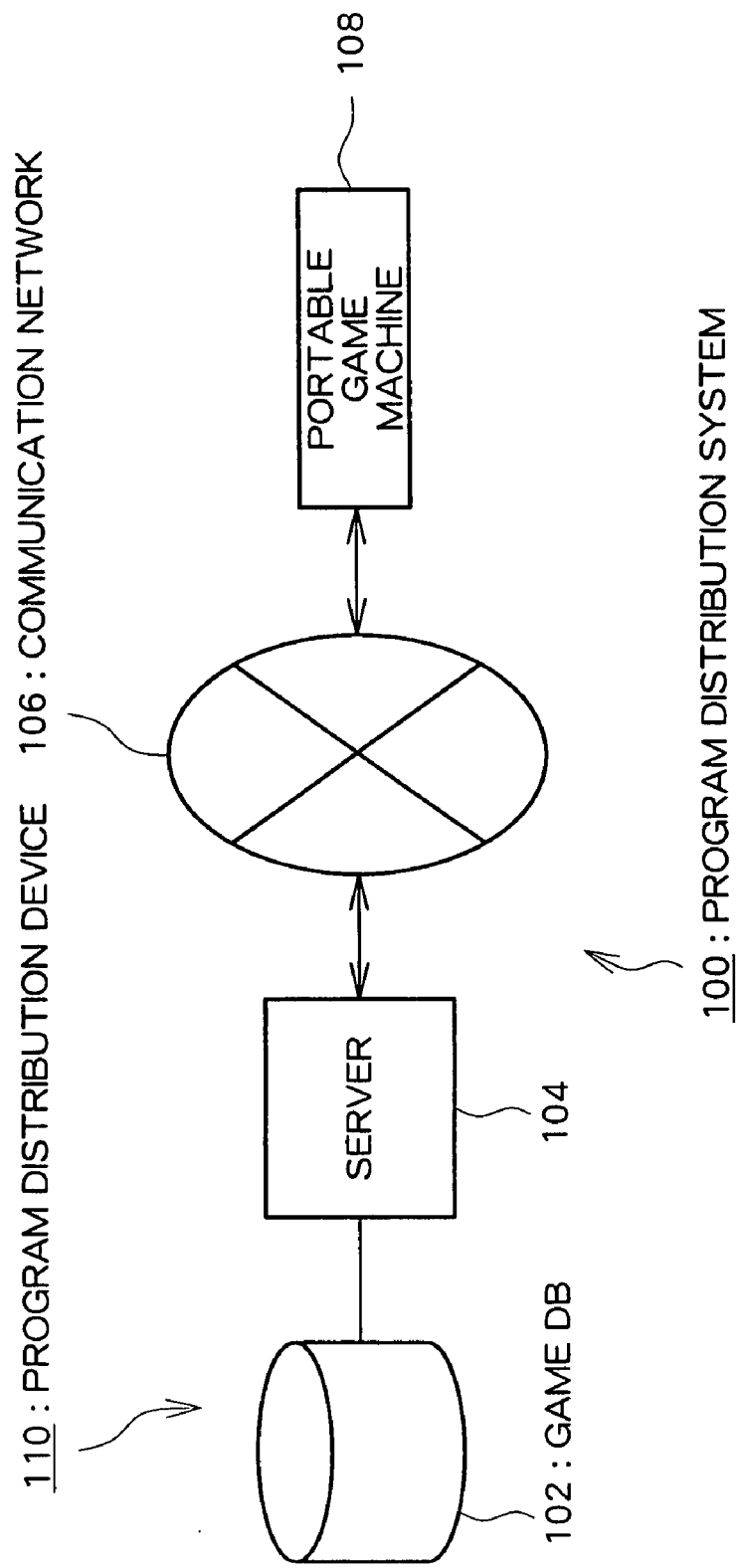

INFORMATION PROCESSING DEVICE, CONTROL METHOD FOR INFORMATION PROCESSING DEVICE, AND INFORMATION STORAGE MEDIUM

TECHNICAL FIELD

The present invention relates to an information processing device, a control method for the information processing device, and an information storage medium.

BACKGROUND ART

There is known an information processing device including a touch panel for outputting pressed position information corresponding to a pressed position, for performing processing based on the pressed position information outputted from the touch panel. For example, there is known a portable game machine including a liquid crystal display panel for displaying a game screen and a touch panel provided to be superimposed on the liquid crystal display panel, for specifying a position pressed by a player based on pressed position information inputted from the touch panel, and executing game processing corresponding to the position.

Incidentally, as the touch panel used for the information processing device described above, there is known one for outputting, when a plurality of positions are pressed, pressed position information indicating only one position, which has a predetermined relation with the plurality of positions, without outputting pressed position information indicating the plurality of positions. For example, there is known a touch panel of a resistive film type (a pressure sensitive type) for outputting, when a plurality of positions are pressed, pressed position information indicating the center of gravity of the plurality of positions. In an information processing device employing such a touch panel, it is difficult to specify a plurality of pressed positions based on only pressed position information outputted from the touch panel.

In this regard, in the touch panel of the resistive film type, when one position is newly pressed in the state in which another position is pressed, pressed position information indicating a midpoint of those positions is outputted. Thus, it is conceivable to calculate, based on coordinates of the position originally pressed and position coordinates (coordinates of the midpoint) outputted from the touch panel, coordinates of the position newly pressed (Patent Document 1). Similarly, when one position is newly pressed in the state in which a plurality of other positions are pressed, since pressed position information indicating the center of gravity of those positions is outputted, it is conceivable to calculate, based on coordinates of the plurality of positions originally pressed and position coordinates (coordinates of the center of gravity) outputted from the touch panel, coordinates of the position newly pressed.

[Patent Document 1] JP 2001-134382 A

DISCLOSURE OF THE INVENTION

Problems to be solved by the Invention

However, it may be impossible to suitably specify a plurality of pressed positions in the above-mentioned method. For example, in the state in which a plurality of positions are pressed, when the center of gravity of the plurality of positions is newly pressed, pressed position information outputted from the touch panel does not change. Thus, it is difficult to judge whether another position is newly pressed.

The present invention has been made in view of the above-mentioned problem and it is an object of the present invention to provide an information processing device, a control method for the information processing device, and an information storage medium, capable of reliably specifying, when one position is newly pressed in the state in which another position or a plurality of other positions on a touch panel are pressed, the newly pressed position.

Means for solving the Problems

In order to solve the above-mentioned problem, an information processing device according to the present invention is an information processing device having: a touch panel that outputs positional information corresponding to a position being pressed; pressed-position acquiring means for acquiring a pressed position based on the positional information outputted from the touch panel; and pressed-position-information storing means for storing pressed position information indicating the pressed position acquired by the pressed-position acquiring means, in which: the information processing device includes: displaying means for displaying a screen including one or a plurality of position guiding images; display limiting means for limiting, when the pressed position information stored in the pressed-position-information storing means indicates a plurality of pressed positions, a display position of the position guiding image based on a position having a predetermined relation with the plurality of pressed positions; and processing executing means for executing processing based on the pressed position acquired by the pressed-position acquiring means and the display position of the position guiding image; and the pressed-position acquiring means acquires, when the pressed position information stored in the pressed-position-information storing means indicates one or a plurality of pressed positions, the pressed position further based on the one or the plurality of pressed positions.

Further, a control method according to the present invention is a control method for an information processing device including a touch panel that outputs positional information corresponding to a position being pressed, including the steps of: acquiring a pressed position based on the positional information outputted from the touch panel; causing pressed-position-information storing means to store pressed position information indicating the pressed position acquired by the step of acquiring a pressed position; causing displaying means to display a screen including one or a plurality of position guiding images; limiting a display position of the position guiding image based on a position having a predetermined relation with the plurality of pressed positions, when the pressed position information stored in the pressed-position-information storing means indicates a plurality of pressed positions; and executing processing based on the pressed position acquired in the step of acquiring a pressed position and the display position of the position guiding image, in which the step of acquiring a pressed position includes acquiring the pressed position further based on the one or the plurality of pressed positions, when the pressed position information stored in the pressed-position-information storing means indicates one or a plurality of pressed positions.

Still further, a program of the present invention is a program for causing a computer to function as an information processing device including: a touch panel that outputs positional information corresponding to a position being pressed; pressed-position acquiring means for acquiring a pressed position based on the positional information outputted from the touch panel; and pressed-position-information storing means for storing pressed position information indicating the pressed position acquired by the pressed-position acquiring means, in which: the program causes the computer to function as: displaying means for displaying a screen including one or a plurality of position guiding images; display limiting means for limiting, when the pressed position information stored in the pressed-position-information storing means indicates a plurality of pressed positions, a display position of the position guiding image based on a position having a predetermined relation with the plurality of pressed positions; and processing executing means for executing processing based on the pressed position acquired by the pressed-position acquiring means and the display position of the position guiding image; and the pressed-position acquiring means acquires, when the pressed position information stored in the pressed-position-information storing means indicates one or a plurality of pressed positions, the pressed position further based on the one or the plurality of pressed positions.

An information storage medium according to the present invention is a computer-readable information storage medium having the program recorded thereon. A program distribution device of the present invention is a program distribution device including the information storage medium having the program recorded thereon, for reading out the program from the information storage medium, and distributing the program. A program distribution method of the present invention is a program distribution method including the information storage medium having the program recorded thereon, of reading out the program from the information storage medium, and distributing the program.

The present invention relates to an information processing device including a touch panel that outputs positional information corresponding to a position being pressed. In the present invention, a pressed position is acquired based on the positional information outputted from the touch panel. Pressed position information indicating the pressed position is stored. In the present invention, a screen including one or a plurality of position guiding images are displayed. When the pressed position information stored indicates one or a plurality of pressed positions, a pressed position is acquired further based on the one or the plurality of pressed positions. Processing is executed based on the pressed position acquired and display positions of the position guiding images. In particular, in the present invention, when the pressed position information stored indicates a plurality of pressed positions, the display positions of the position guiding images are limited based on a position having a predetermined relation with the plurality of pressed positions. The "position guiding image" is an image for guiding a user to a position on the touch panel that the user should press and is, for example, an image such as an icon image, a button image, or a character image. In other words, when the user presses an area on the touch panel corresponding to a display area of the image, processing corresponding to the pressed area (an image thereon) is executed. According to the present invention, when one position is newly pressed in the state in which another or a plurality of other positions on the touch panel are pressed, it is possible to reliably specify the newly pressed position. As a result, it is possible to suitably realize an information processing device that causes the user to press a plurality of positions on the touch panel.

Further, according to an aspect of the present invention, in the information processing device, the display position of the position guiding image may be limited such that a position on the screen corresponding to the position having the predetermined relation with the plurality of pressed positions indicated by the pressed position information is not included in the display area of the position guiding image.

Further, according to another aspect of the present invention, in the information processing device, the display position of the position guiding image may be limited such that at least part of the position guiding image is not included in an area on the screen corresponding to the position having the predetermined relation with the plurality of pressed positions indicated by the pressed position information.

Further, according to another aspect of the present invention, in the information processing device, the position having the predetermined relation with the plurality of pressed positions indicated by the pressed position information may be a center of gravity of the plurality of pressed positions indicated by the pressed position information.

BRIEF DESCRIPTION OF THE DRAWINGS

FIG. 10 is a diagram showing an example of pressed position data.

FIG. 11 is a diagram showing an example of a determination area table.

FIG. 12 is a diagram showing an example of an insect character table.

FIG. 16 is a diagram showing an overall structure of a program distribution system according to another embodiment of the present invention.

BEST MODE FOR CARRYING OUT THE INVENTION

An example of an embodiment of the present invention will be hereinafter explained in detail based on the drawings. Here, an example in the case where the present invention is applied to a portable game machine (game device) will be explained.

Figure 1:
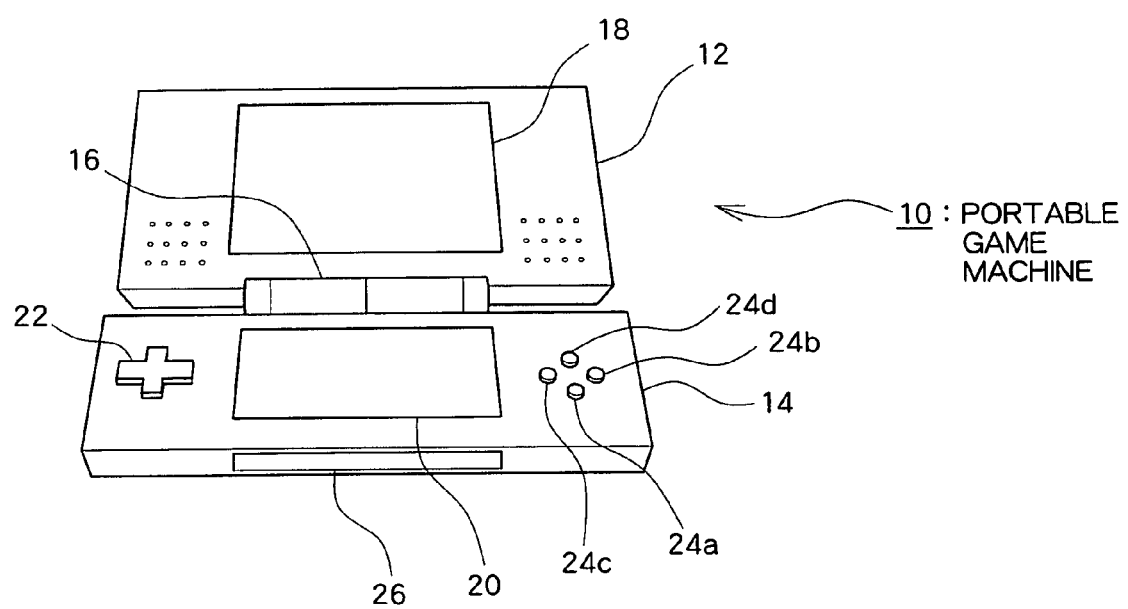
FIG. 1 is a perspective view showing an external appearance of a portable game machine according to an embodiment of the present invention.

FIG. 1 is a diagram showing an external appearance of the portable game machine according to this embodiment. A portable game machine 10 shown in the figure includes an upper housing 12 and a lower housing 14. The upper housing 12 and the lower housing 14 are coupled via a hinge section 16. The portable game machine 10 is adapted to take a play state in which a player can see the surfaces of the upper housing 12 and the lower housing 14 shown in the figure and a folded state in which the surface of the upper housing 12 and the surface of the lower housing 14 are put together. According to the portable game machine 10, the player can play a game with battery drive irrespective of a place.

A liquid crystal display panel 18 is provided on the surface of the upper housing 12. A speaker is built into the upper housing 12. On the other hand, a touch screen 20, a cross button 22, and buttons 24a, 24b, 24c, and 24d are provided on the surface of the lower housing 14. The touch screen 20 is constituted by placing a publicly-known touch panel on a publicly-known liquid crystal display panel. A cartridge slot 26 in which a game cartridge is removably insertable is provided on a side on the front side of the lower housing 14. A cartridge slot is also provided on a side on the rear side of the lower housing 14. Not-shown other members such as a power switch are also attached to the portable game machine 10.

Figure 2:
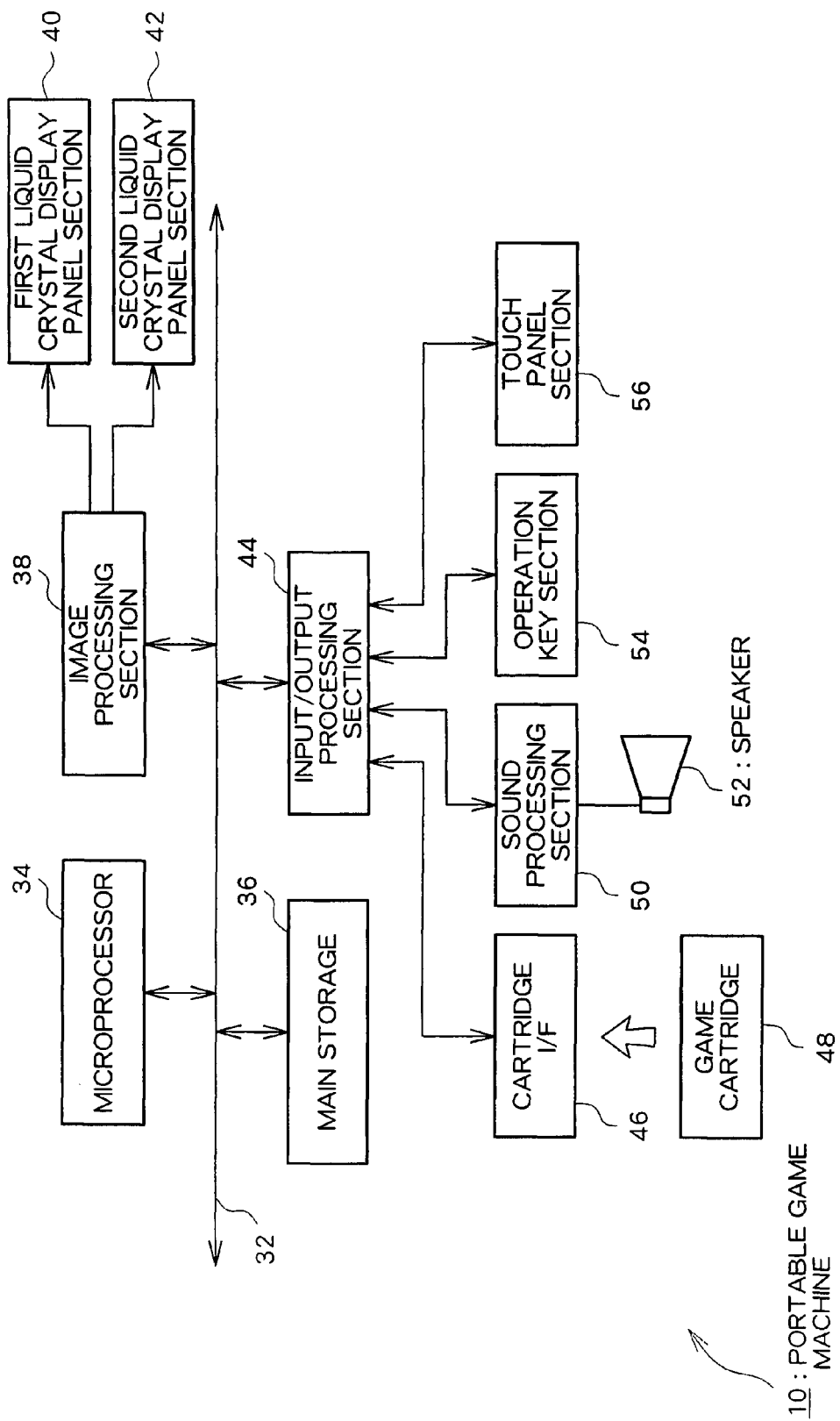
FIG. 2 is a hardware configuration diagram of the portable game machine according to the embodiment of the present invention.

FIG. 2 shows a hardware configuration of the portable game machine 10. The portable game machine 10 according to this embodiment is realized when a game cartridge 48 having a ROM built therein is inserted into a cartridge interface (a cartridge I/F) 46 and a game program stored in the ROM is read into the portable game machine 10. Here, the game cartridge 48 is used for supplying the game program to the portable game machine 10. However, it is also possible to use any other information storage medium such as a CD-ROM or a DVD. It is also possible to supply the game program from a remote location to the portable game machine 10 through a communication network such as the Internet. It is also possible to supply the game program from a stationary game machine, a personal computer, or the like to the portable game machine 10 using various kinds of data communication such as infrared ray communication.

The portable game machine 10 is a publicly-known computer game system including a bus 32, a microprocessor 34, a main storage 36, an image processing section 38, a first liquid crystal panel section 40, a second liquid crystal display panel section 42, an input/output processing section 44, a cartridge I/F 46, a sound processing section 50, a speaker 52, an operation key section 54, and a touch panel section 56. These sections are stored in a housing together with a battery. The portable game machine 10 is driven by the battery and is portable.

The bus 32 is a circuit via which addresses and data are transmitted and received by the respective sections of the portable game machine 10. The microprocessor 34, the main storage 36, the image processing section 38, and the input/output processing section 44 are connected to each other via the bus 32 so as to be communicable with each other.

The microprocessor 34 controls the individual sections of the portable game machine 10 on the basis of an operating system stored in a ROM (not shown) and a game program read from the game cartridge 48. The main storage 36 is a memory composed of, for example, a RAM, and the game program read from the game cartridge 48 are written in the main storage 36 if necessary. The main storage 36 is also employed as an operating area for the microprocessor 34.

The first liquid crystal display panel section 40 and the second liquid crystal display panel section 42 are constituted by publicly-known liquid crystal display panels. The image processing section 38 causes the first liquid crystal display panel section 40 or/and the second liquid crystal display panel section 42 to display and output, at predetermined timing, game image data generated by the microprocessor 34. In this explanation, it is assumed that the first liquid crystal display panel section 40 corresponds to the liquid crystal display panel of the lower housing 14 (the liquid crystal display panel of the touch screen 20) and the second liquid crystal display panel section 42 corresponds to the liquid crystal display panel 18 of the upper housing 12.

The input/output processing section 44 is an interface for the microprocessor 34 to access the cartridge I/F 46, the sound processing section 50, the operation key section 54, and the touch panel section 56. The cartridge I/F 46, the sound processing section 50, the operation key section 54, and the touch panel section 56 are connected to the input/output processing section 44.

The cartridge I/F 46 has an opening for housing the game cartridge 48. A signal input/output terminal is provided in the inner part of the cartridge I/F 46. It is possible to exchange signals between the cartridge I/F 46 and the game cartridge 48 by pushing the game cartridge 48 into the opening and connecting the signal input/output terminal and a terminal (not shown) of the game cartridge 48 each other.

The sound processing section 50, which is composed of a sound buffer, reproduces various categories of sound data such as game music, game sound effects, and messages that are read from the game cartridge 48 and stored in the sound buffer, and outputs the reproduced sound data from the speaker 52.

The operation key section 54 is inputting means with which the player performs game operation. The operation key section 54 includes the cross button 22, the buttons 24a, 24b, 24c, and 24d, and the like shown in FIG. 1. The input/output processing section 44 scans states of respective sections of the operation key section 54 every fixed period (e.g., every 1/60 second) and passes an operation signal indicating a result of the scan to the microprocessor 34 via the bus 32. The microprocessor 34 determines game operation of the player based on the operation signal.

The touch panel section 56 is inputting means with which the player performs game operation input. The touch panel section 56 supplies a signal indicating positional information corresponding to a position pressed by a finger of the player, a pen, or the like to the microprocessor 34. The touch panel section 56 is provided to be placed on the first liquid crystal panel section 40. The touch panel section 56 is constituted by, for example, a publicly-known touch panel of a resistive film type (a pressure sensitive type). In other words, the touch panel section 56 includes an upper conductive film (resistive film) and a lower conductive film (resistive film). A space is formed between these films. Only when the touch panel section 56 is pressed, these films come into contact with each other and apply an electric current. The touch panel section 56 detects a voltage outputted according to the contact of the upper conductive film and the lower conductive film and outputs position coordinates of a pressed position acquired based on the output voltage. When a plurality of positions are pressed, the touch panel section 56 outputs position coordinates of a position having a predetermined relation with the plurality of pressed positions. In this explanation, it is assumed that the touch panel section 56 is constituted by the touch panel of the resistive film type. However, the touch panel section 56 may be constituted by touch panels of other types.

In the portable game machine 10 having the structure described above, a game for catching insect characters displayed on a game screen by holding the insect characters with a finger is provided. This game will be hereinafter explained.

Figure 5:
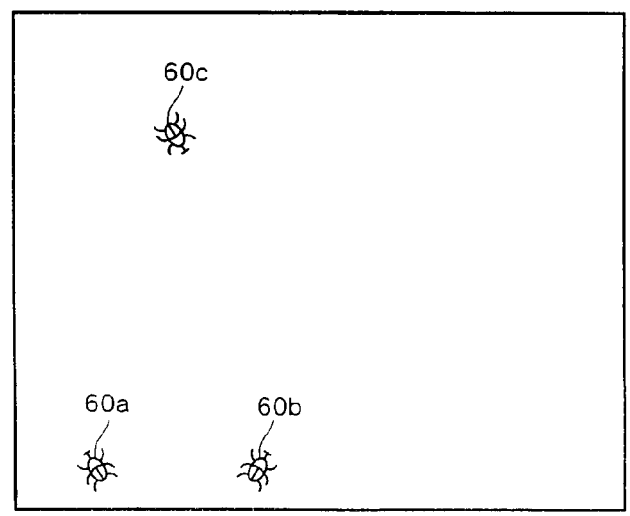
FIG. 5 is a perspective view showing an example of the game screen.
Figure 6:
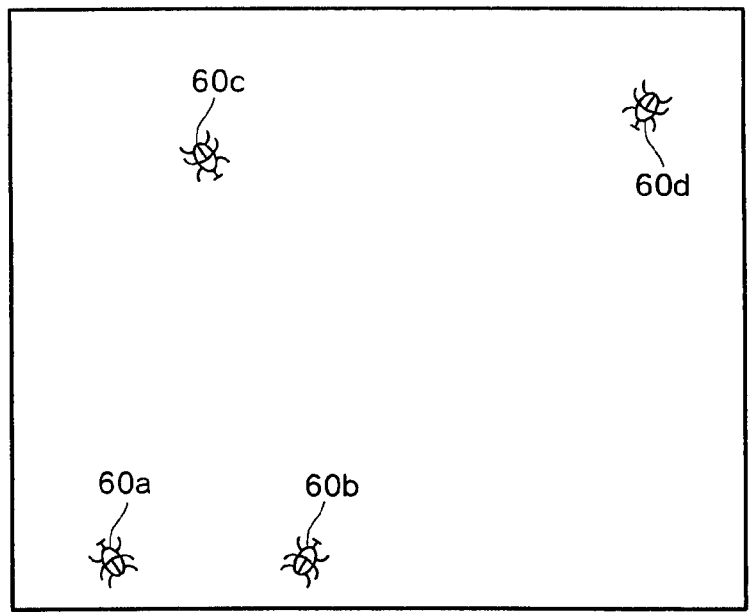
FIG. 6 is a perspective view showing an example of the game screen.
Figure 7:
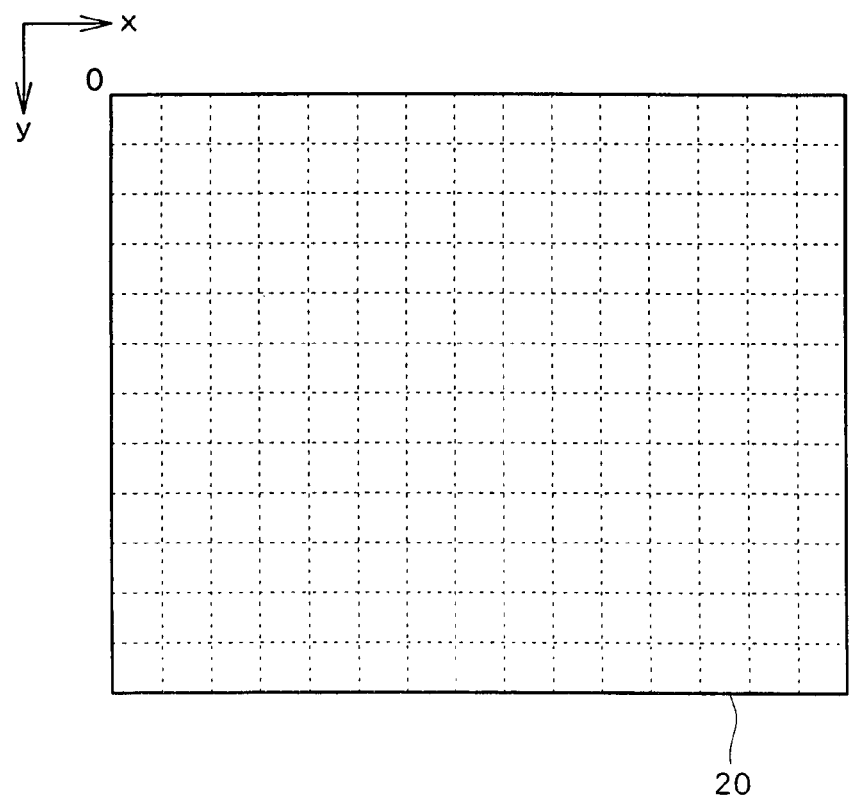
FIG. 7 is a diagram showing a determination area.
Figure 8:
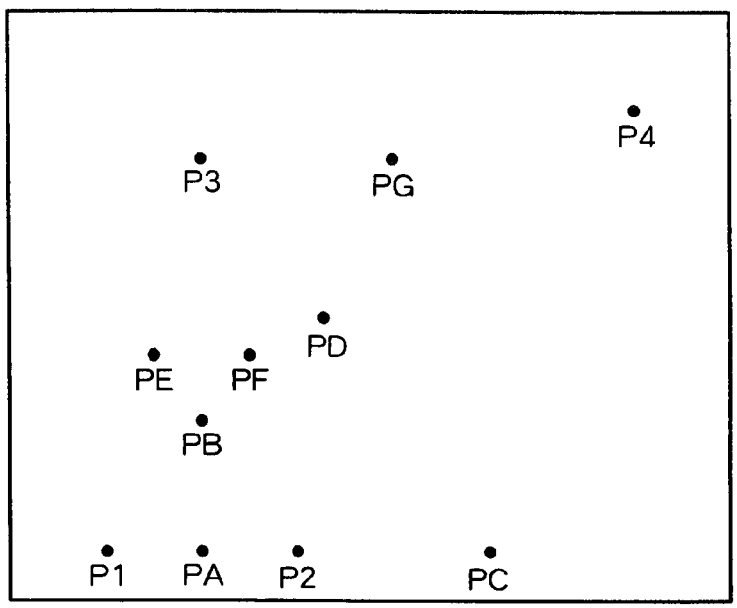
FIG. 8 is a diagram for explaining acquisition of pressed positions and limitation on display positions of insect character images.

FIGS. 3 to 6 show examples of game screens displayed on the touch screen 20. FIG. 7 shows a determination area virtually provided in the touch screen 20. FIG. 8 is a diagram for explaining acquisition of pressed positions and limitation on display positions of insect character images.

Figure 3:
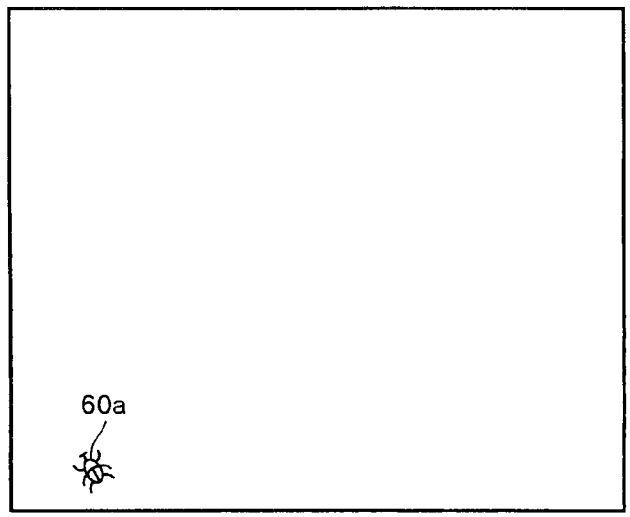
FIG. 3 is a perspective view showing an example of a game screen.

FIG. 3 shows a game screen during the start of play. As shown in the figure, one insect character image 60a is displayed on the game screen during the start of play. An initial display position of the insect character image 60a is determined based on random numbers. A display position of the insect character image 60a is updated every predetermined time (e.g., 1/60 second) and a state of the insect character moving around is displayed on the game screen.

The player grips the lower housing 14 with one hand and presses the touch screen 20 with a finger (a first finger) of the other hand to hold the insect character image 60a displayed on the game screen. In this case, position coordinates outputted from the touch panel section 56 are acquired as a position (P1) pressed by the first finger.

When at least a part of the insect character image 60a is included in the determination area to which the position coordinates outputted from the touch panel section 56 belongs (more precisely, position coordinates on the game screen corresponding to the position coordinates outputted from the touch panel section 56), the insect character image 60a is judged as being held by the player. In other words, it is judged that an insect character associated with the insect character image 60a is caught by the player.

Figure 4:
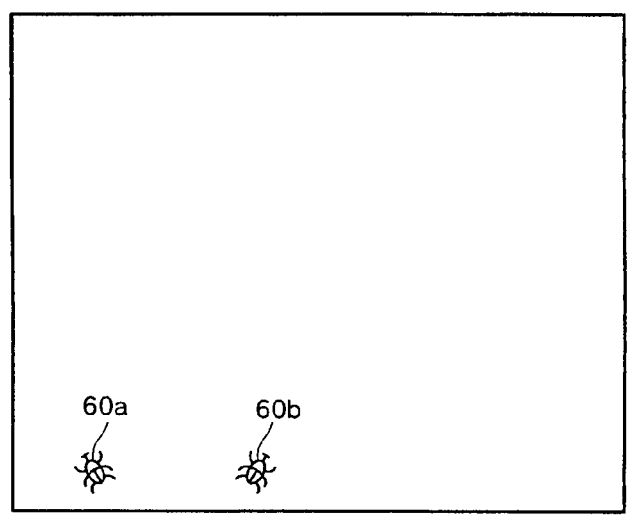
FIG. 4 is a perspective view showing an example of the game screen.

When the insect character image 60a is held by the player, the update of the display position of the insect character image 60a is controlled. The coordinates of the pressed position (P1) of the first finger are held in the main storage 36. As shown in FIG. 4, an insect character image 60b is additionally displayed on the game screen. Like the insect character image 60a, an initial display position of the insect character image 60b is determined based on random numbers. A display position of the insect character image 60b is updated every predetermined time (e.g., 1/60 second).

On this game screen, the player holds the insect character image 60b with another finger (a second finger) while holding the insect character image 60a with the first finger. When the touch panel section 56 is pressed by the first and second fingers, coordinates of the midpoint of those pressed positions are outputted from the touch panel section 56. Therefore, it is possible to calculate a pressed position (P2) of the second finger based on the pressed position (P1) of the first finger held in the main storage 36 and the output position (PA) from the touch panel section 56. The judgment on whether the insect character image 60b is held is performed based on coordinates of this calculated pressed position in the same manner as the case of the insect character image 60a.

When the insect character image 60b is held by the player, the update of the display position of the insect character image 60b is further controlled. The coordinates of the pressed position (P2) of the second finger are held in the main storage 36. As shown in FIG. 5, an insect character image 60c is additionally displayed on the game screen. An initial display position of the insect character image 60c is determined based on random numbers. A display position of the insect character image 60c is updated every predetermined time (e.g., 1/60 second).

On this game screen, the player holds the insect character image 60c with another finger (a third finger) while holding the insect character images 60a and 60b with the first and second fingers. When the touch panel section 56 is pressed by the first, second, and third fingers, coordinates of the center of gravity of pressed positions of those fingers are outputted from the touch panel section 56. Therefore, it is possible to calculate a pressed position (P3) of the third finger based on the pressed position (P1) of the first finger and the pressed position (P2) of the second finger held in the main storage 36 and the output position (PB) from the touch panel section 56. The judgment on whether the insect character image 60c is held is performed based on coordinates of this calculated pressed position in the same manner as the case of the insect character image 60a.

The display position (including the initial display position) of the insect character image 60c is determined such that the coordinates of the midpoint (PA) of the pressed positions (P1 and P2) of the first and second fingers (more precisely, position coordinates on the game screen corresponding to such coordinates of the midpoint) are not included in a display area of the insect character image 60c. When the midpoint (PA) of the pressed positions (P1 and P2) of the first and second fingers is pressed by the third finger in the state in which the touch panel section 56 is pressed by the first and second fingers, the output position (PA) in the state in which the touch panel section 56 is pressed by the first and second fingers and the output position (PB) in the state in which the touch panel section 56 is pressed by the first, second, and third fingers are the same. Thus, it is impossible to detect that the touch panel section 56 is pressed by the third finger. In other words, it is impossible to detect that the insect character image 60c is held by the third finger. In this regard, in the portable game machine 10, the display position of the insect character image 60c is limited as described above such that output positions from the touch panel section 56 are different in the state in which the touch panel section 56 is pressed by the first and second fingers and in the state in which the touch panel section 56 is pressed by the first, second, and third fingers. In other words, it is possible to reliably perform judgment on whether the insect character image 60c is held.

The display position of the insect character image 60c is determined such that the center of gravity of the position and the pressed positions (P1 and P2) of the first and second fingers does not coincide with the pressed position (P1) of the first finger or the pressed position (P2) of the second finger. For example, the display position of the insect character image 60c is determined not to be in a position such as the position (PC) shown in FIG. 8. Consequently, when the pressed position (P1 or P2) of the first or second finger is outputted from the touch panel section 56, it is possible to judge that the pressing by the first or second finger is released. In other words, it is possible to judge whether the pressing by the first or second finger is released.

When the insect character image 60c is held by the player, the update of the display position of the insect character image 60c is further controlled. The coordinates of the pressed position (P3) of the third finger are held in the main storage 36. As shown in FIG. 6, an insect character image 60d is additionally displayed on the game screen. An initial display position of the insect character image 60d is determined based on random numbers. A display position of the insect character image 60d is updated every predetermined time (e.g., 1/60 second).

On this game screen, the player holds the insect character image 60d with another finger (a fourth finger) while holding the insect character images 60a, 60b, and 60c with the first, second, and third fingers. When the touch panel section 56 is pressed by the first, second, third, and fourth fingers, coordinates of the center of gravity of pressed positions of those fingers are outputted from the touch panel section 56. Therefore, it is possible to calculate a pressed position (P4) of the fourth finger based on the pressed position (P1) of the first finger, the pressed position (P2) of the second finger, and the pressed position (P3) of the third finger held in the main storage 36 and an output position (PD) from the touch panel section 56. The judgment on whether the insect character image 60*d* is held is performed based on coordinates of this calculated pressed position in the same manner as the case of the insect character image 60*a*.

The display position (including the initial display position) of the insect character image 60*d* is determined such that the coordinates of the center of gravity (PB) of the pressed positions (P1, P2, and P3) of the first, second, and third fingers (more precisely, position coordinates on the game screen corresponding to such coordinates of the center of gravity) are not included in a display area of the insect character image 60*d*. When the center of gravity (PB) of the pressed positions (P1, P2, and P3) of the first, second, and third fingers is pressed by the fourth finger in the state in which the touch panel section 56 is pressed by the first, second, and third fingers, the output position (PB) in the state in which the touch panel section 56 is pressed by the first, second, and third fingers and the output position (PD) in the state in which the touch panel section 56 is pressed by the first, second, third, and fourth fingers are the same. Thus, it is impossible to detect that the touch panel section 56 is pressed by the fourth finger. In other words, it is impossible to detect that the insect character image 60*d* is held by the fourth finger. In this regard, in the portable game machine 10, the display position of the insect character image 60*d* is limited as described above such that output positions from the touch panel section 56 are different in the state in which the touch panel section 56 is pressed by the first, second, and third fingers and in the state in which the touch panel section 56 is pressed by the first, second, third, and fourth fingers. In other words, it is possible to reliably perform judgment on whether the insect character image 60*d* is held.

The display position of the insect character image 60*d* is determined such that the center of gravity of the position and the pressed positions (P1, P2, and P3) of the first, second, and third fingers does not coincide with the pressed position (P1) of the first finger, the pressed position (P2) of the second finger, or the pressed position (P3) of the third finger. Moreover, the display position of the insect character image 60*d* is determined such that the center of gravity of the position and the pressed positions (P1, P2, and P3) of the first, second, third fingers does not coincide with the midpoints (PA, PE, and PF) of two positions among the pressed positions (P1, P2, and P3) of the first, second, third fingers. For example, the display position of the insect character image 60*d* is determined not to be in a position such as the position (PG) shown in FIG. 8. Consequently, when those positions are outputted from the touch panel section 56, it is possible to judge that the pressing by the first, second, or third finger is released.

When the insect character image 60*d* is pressed by the player, the update of the display position of the insect character image 60*d* is further controlled and the coordinates of the pressed position (P4) of the fourth finger are held in the main storage 36. A new insect character image is displayed on the game screen. An initial display position of this insect character image is determined in the same manner as the insect character image 60*d*. A display position of this insect character image is updated in the same manner as the insect character image 60*d*. When this insect character image is held by the player, a game clear screen (not shown) is displayed and time required for holding all the insect character images is displayed.

Figure 9:
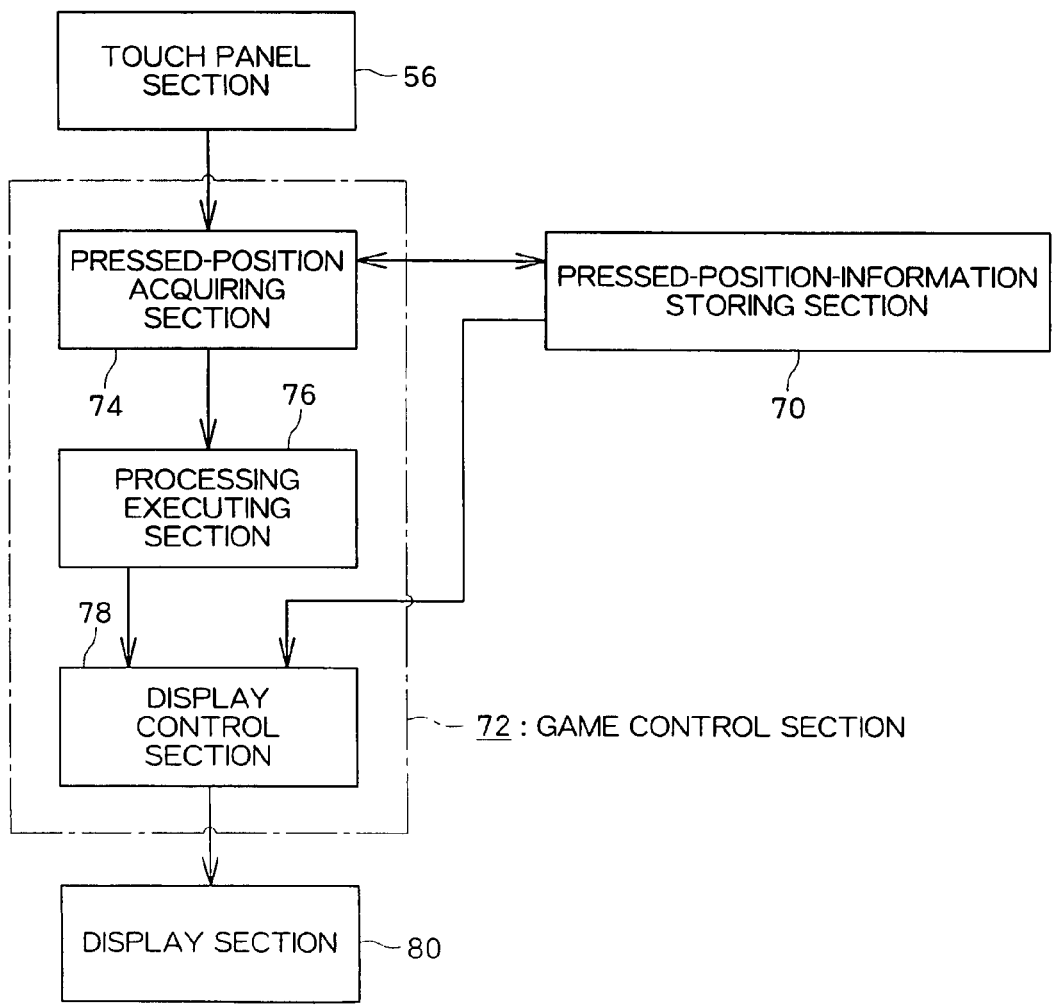
FIG. 9 is a diagram showing functional blocks of the portable game machines according to the embodiment of the present invention.

Functional blocks of the game device according to this embodiment will be explained. FIG. 9 is a functional block diagram of the portable game machine 10. As shown in the figure, the portable game machine 10 includes a pressed-position-information storing section 70, a game control section 72, and a display section 80. Functions of these sections are realized when a program supplied through the game cartridge 48 is executed by the microprocessor 34.

[1. Pressed-Position-Information Storing Section]

The pressed-position-information storing section 70 is mainly realized by the main storage 36. Positional information indicating one or a plurality of positions on the touch panel section 56 is stored in the pressed-position-information storing section 70. Specifically, for example, pressed position data shown in FIG. 10 is stored. Coordinates of a pressed position acquired by a pressed-position acquiring section 74 are stored in this pressed position data. Details will be described later (see Steps S113 and S115 in FIG. 14).

[2. Display Section]

The display section 80 is mainly realized by the first liquid crystal display panel section 40. The display section 80 displays a game screen including one or a plurality of insect character images (position guiding images).

[3. Game Control Section]

The game control section 72 includes a pressed-position acquiring section 74, a processing executing section 76, and a display control section 78 (display controlling means).

[3-1. Pressed-Position Acquiring Section]

The pressed-position acquiring section 74 acquires a pressed position based on positional information outputted from the touch panel section 56. For example, when coordinates of the pressed position are not stored in pressed position data stored in the pressed-position-information storing section 70, the pressed-position acquiring section 74 acquires position coordinates outputted from the touch panel section 56 as coordinates of the pressed position. When coordinates of one or a plurality of pressed positions are stored in the pressed position data, the pressed-position acquiring section 74 acquires a pressed position (an estimated pressed position) based on the one or a plurality of pressed positions. In other words, the pressed-position acquiring section 74 acquires a position, the center of gravity of which, and the one or a plurality of pressed positions, is a position (an output position) outputted from the touch panel section 56, as a pressed position. Details will be described later (see Step S112 in FIG. 14).

When the pressed position is acquired, the pressed-position acquiring section 74 updates the pressed position data to further indicate the pressed position. In other words, the pressed-position acquiring section 74 adds and stores coordinates of the pressed position acquired in the pressed position data.

[3-2. Processing Executing Section]

The processing executing section 76 executes game processing based on the pressed position acquired by the pressed-position acquiring section 74 and display positions of insect character images displayed on the game screen.

Specifically, the processing executing section 76 determines whether the pressed position acquired by the pressed-position acquiring section 74 and the display positions of the respective insect character images satisfy a predetermined condition. For example, the processing executing section 76 determines whether a position on the game screen corresponding to the pressed position acquired by the pressed-position acquiring section 74 is included in display areas of the respective insect character images. In this embodiment, a determination area table shown in FIG. 11 is stored in the processing executing section 76. As shown in the figure, the determination area table includes an area ID field, an x coordinate field, and a y coordinate field. An area ID is stored in the area ID field. The area ID is identification information for identifying the determination area (see FIG. 7) virtually provided in the game screen (the touch panel). In the x coordinate field, information indicating a range of an x coordinate of the determination area is stored. In the y coordinate field, information indicating a range of a y coordinate of the determination area is stored. The processing executing section 76 determines whether at least a part of the display areas of the insect character images are included in a determination area to which the position on the game screen corresponding to the pressed position acquired by the pressed-position acquiring section 74 belongs.

The processing executing section 76 executes game processing corresponding to a result of the determination. For example, when it is determined that the pressed position acquired by the pressed-position acquiring section 74 and the display position of any one of the insect character images satisfy the predetermined condition, the processing executing section 76 executes game processing corresponding to the insect character image and advances the game. Details will be described later (see Steps S118 to S121 and S123 in FIG. 14).

[3-3. Display Control Section]

The display control section 78 limits the display positions of the insect character images displayed on the game screen based on the pressed position data stored in the pressed-position-information storing section 70. For example, when position coordinates of a plurality of pressed positions are stored in the pressed position data, the display control section 78 limits the display positions of the insect character images based on a position having a predetermined relation with those a plurality of pressed positions. The "position having a predetermined relation with those a plurality of pressed positions" is, for example, a position calculated by substituting those plurality of pressed positions in a predetermined arithmetic expression and, more specifically, is the center of gravity or the like of those plurality of pressed positions. In this embodiment, the display control section 78 limits the display positions of the insect character images such that a position on the game screen corresponding to the center of gravity of those plurality of pressed positions is not included in the display areas of the insect character images. Further, for example, the display control section 78 limits the display positions of the insect character images such that at least parts of the insect character images are not included in an area on the game screen corresponding to the center of gravity of those plurality of pressed positions. Details will be described later (see Steps S120 to S130 in FIG. 15 and S121 in FIG. 14).

In the display control section 78, an insect character table shown in FIG. 12 is stored. As shown in the figure, the insect character table includes an ID field, position coordinates field, a moving path field, and a state flag field. An ID is stored in the ID field. The ID is identification information for identifying an insect character image. In the position coordinates field, coordinates of a display position of the insect character image are stored. More specifically, coordinates of a representative point (e.g., a center point) of the insect character image are stored. In the moving path field, various kinds of information for specifying a moving path of the insect character image are stored. In the state flag field, information indicating a state of the insect character image is stored. In this embodiment, when the insect character image is not displayed on the game screen yet, "0" is stored. When the insect character image is displayed on the game screen and is not captured yet, "1" is stored. Moreover, when the insect character image is displayed on the game screen and is already captured, "2" is stored.

Figure 13:
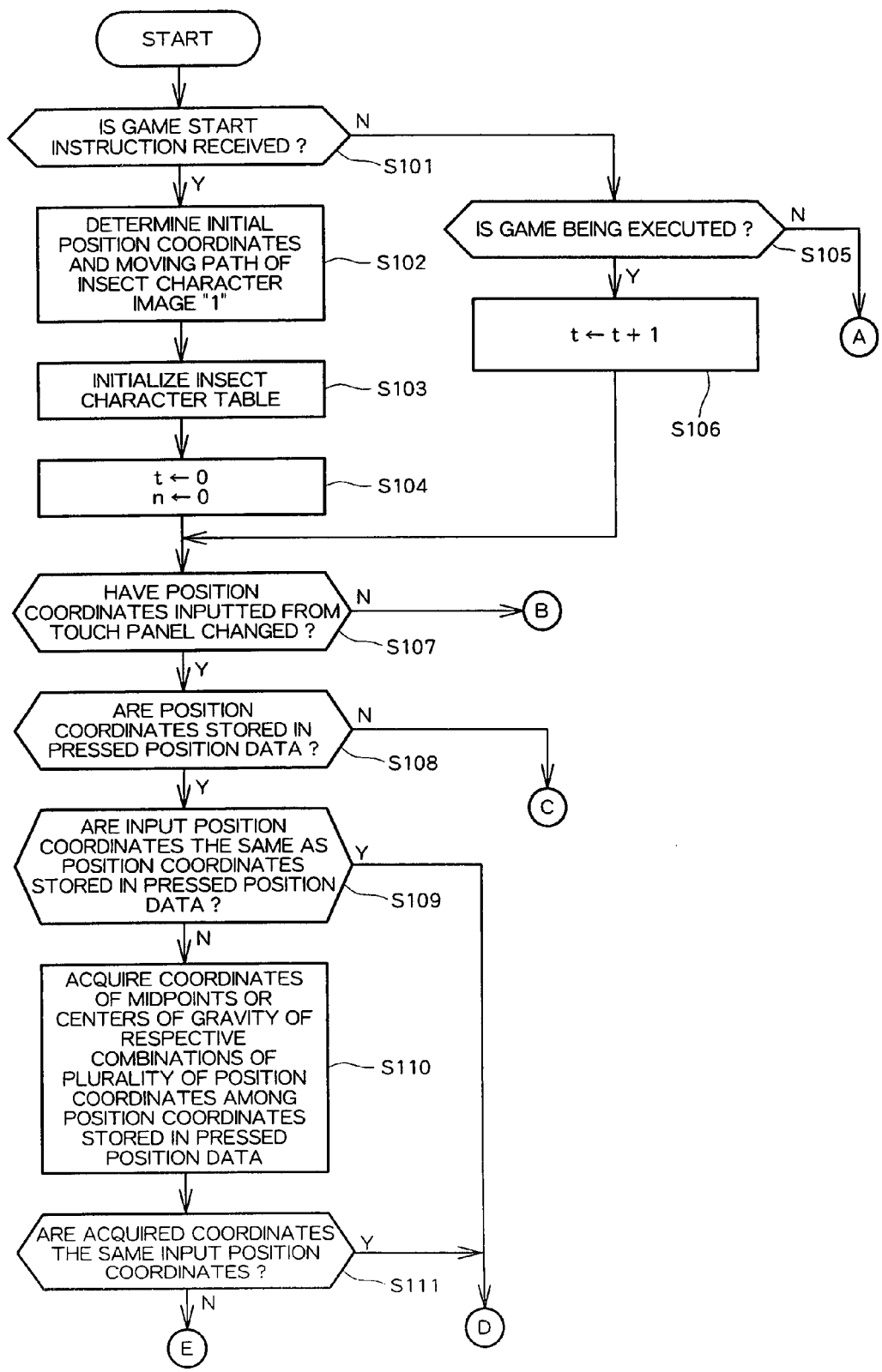
FIG. 13 is a flowchart showing processing executed in the portable game machine.
Figure 14:
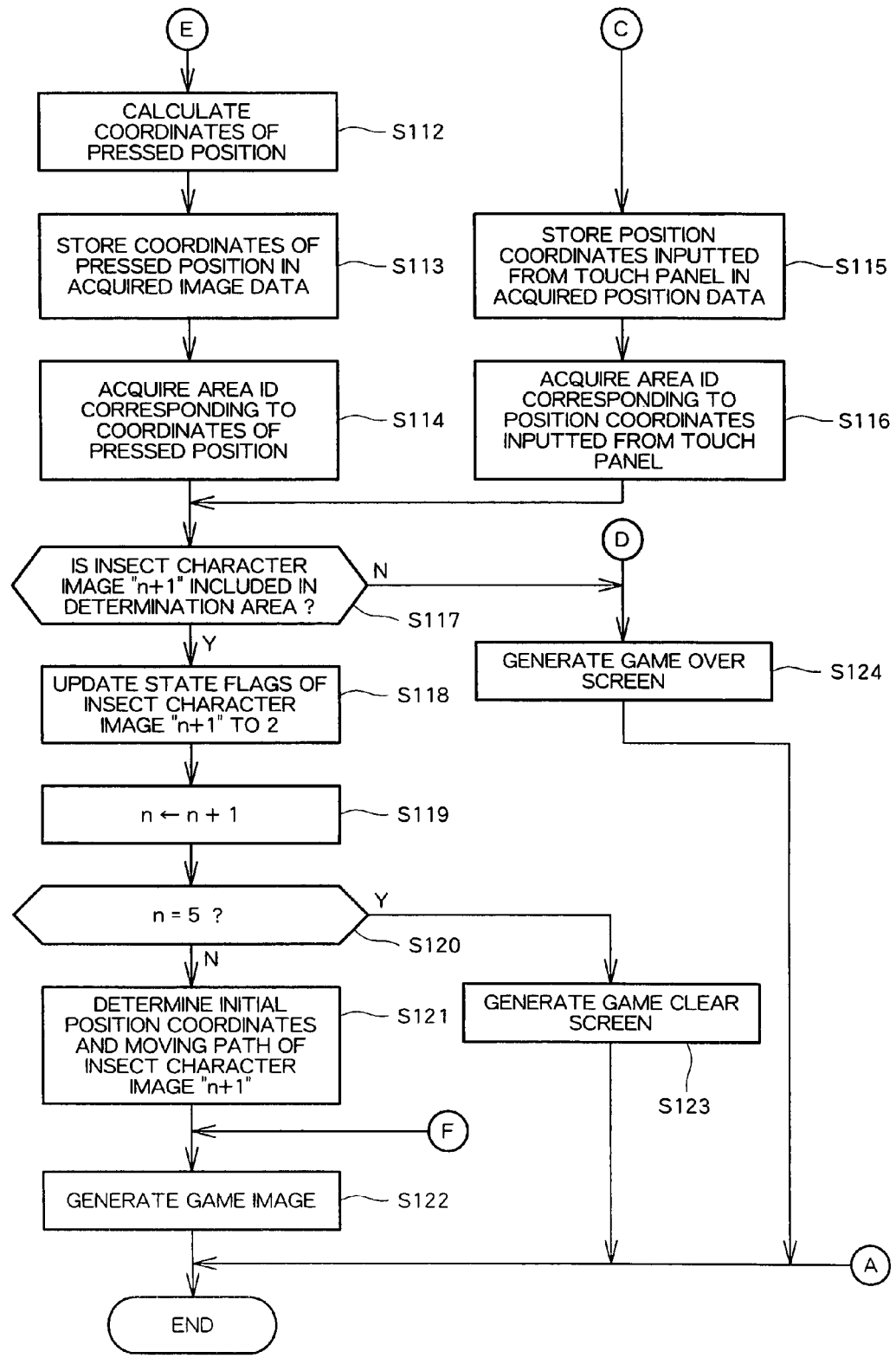
FIG. 14 is a flowchart showing processing executed in the portable game machine.
Figure 15:
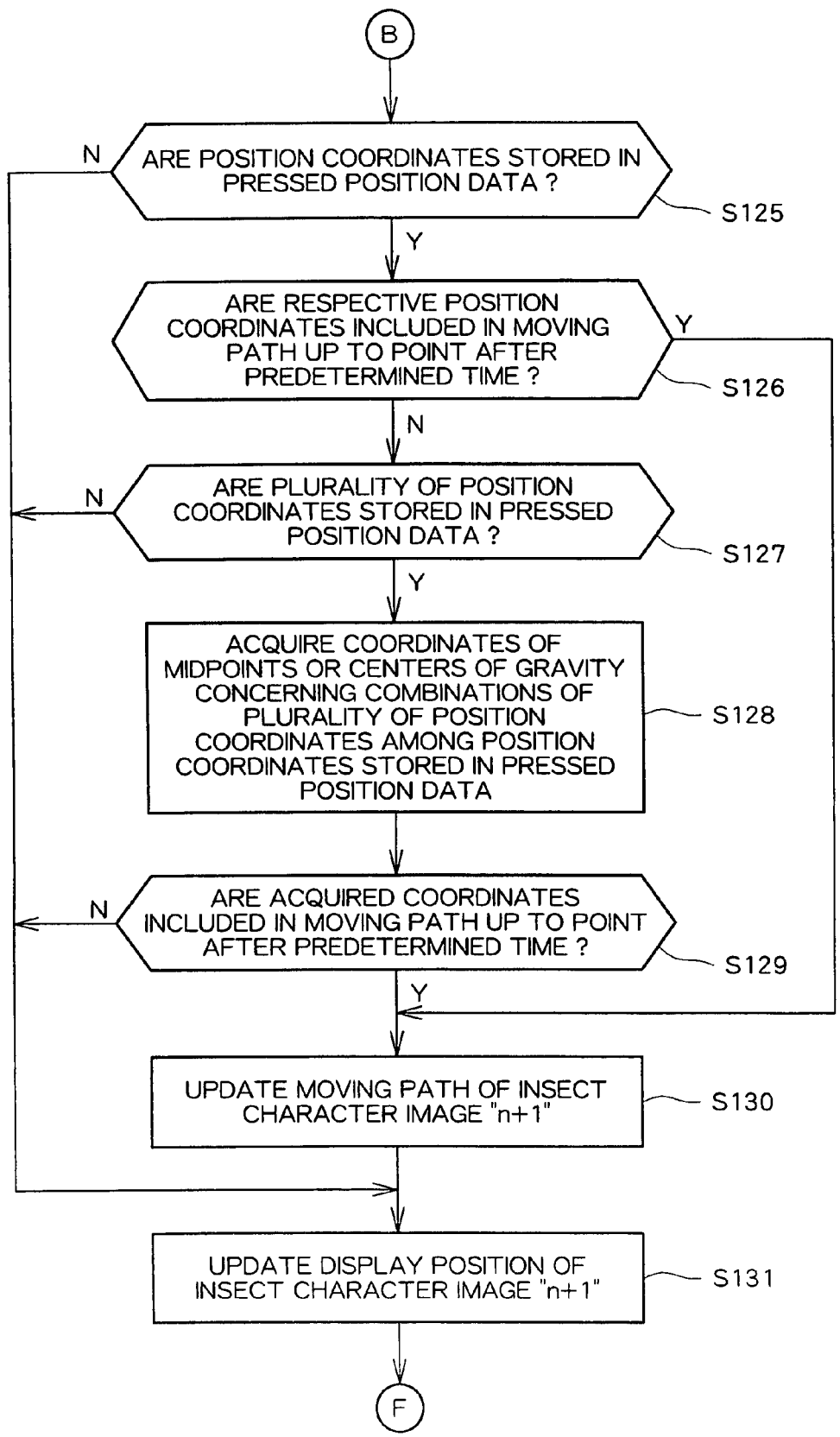
FIG. 15 is a flowchart showing processing executed in the portable game machine.

Processing executed in the portable game machine 10 will be explained. FIGS. 13 to 15 are flowcharts showing processing related to the present invention in the processing executed every predetermined time (e.g., 1/60 second) in the portable game machine 10.

As shown in FIG. 13, in the game processing, first, it is judged whether a game start instruction is received (S101). When it is judged that the game start instruction is received, initial position coordinates and a moving path of an insect character image of an ID "1" are determined (S102). These are determined based on random numbers.

When the initial position coordinates and the like of the insect character image of the ID "1" are determined, the insect character table is initialized (S103). Specifically, the respective fields corresponding to the ID "1" are updated as described below. The initial position coordinates determined in Step S102 are stored in the position coordinates field. Various kinds of information for specifying the moving path determined in Step S102 are stored in the moving path field. The state flag field is updated to "1". The state flag fields corresponding to IDs "2" to "5" are updated to "0". Moreover, the other fields corresponding to the IDs "2" to "5" are initialized to be, for example, an empty state.

When the initialization of the insect character table is completed, an elapsed time counter t and a captured number counter n are initialized to be 0 (S104). The elapsed time counter t is incremented every time it is judged in Step S105 that a game is being executed (S106). The elapsed time counter t is numerical value information indicating an elapsed time from the start of the game in units of, for example, 1/60 second. The captured number counter n is information indicating the number of insect character images determined as being held by the player. Both the elapsed time counter t and the captured number counter n are held in the main storage 36.

Subsequently, the pressed-position acquiring section 74 judges whether position coordinates (input position coordinates) inputted from the touch panel section 56 have changed (S107). In other words, the pressed-position acquiring section 74 judges whether another position is newly pressed. In this case, a change in a degree that can be recognized as an error is neglected. When it is judged that the input position coordinates from the touch panel section 56 have changed, the pressed-position acquiring section 74 acquires the input position coordinates.

Thereafter, the pressed-position acquiring section 74 judges whether position coordinates are already stored in the pressed position data (S108).

When it is judged that position coordinates are already stored in the pressed position data, the processing executing section 76 judges whether the input position coordinates are the same as any one of the position coordinates stored in the pressed position data (S109). When a distance between the input position coordinates and position coordinates stored in the pressed position data are within a predetermined distance, the processing executing section 76 judges that the input position coordinates are the same as the position coordinates.

When it is judged that the input position coordinates are not the same as any one of the position coordinates stored in the pressed position data, the processing executing section 76 acquires, concerning respective combinations of a plurality of position coordinates among the position coordinates stored in the pressed position data, coordinates of the midpoint or the center of gravity of the combinations of the position coordinates (S110). The processing executing section 76 judges whether the input position coordinates are the same as any one of the position coordinates acquired in Step S110 (S111). When a distance between the input position coordinates and position coordinates acquired in Step S110 is within a predetermined distance, the processing executing section 76 judges that the input position coordinates are the same as the position coordinates.

When it is judged in Step S109 that the input position coordinates are the same as any one of the position coordinates stored in the pressed position data or when it is judged in Step S111 that the input position coordinates are the same as any one of the position coordinates acquired in Step S110, the processing executing section 76 judges that the pressing by any one of the fingers is released and instructs the display control section 78 to display a game over screen on the display section 80 (S124). In this case, the display control section 78 generates a game over screen in a VRAM. The game over screen generated in the VRAM is displayed on the display section 80 at a predetermined timing.

On the other hand, when it is judged in Step S111 that the input position coordinates are not the same as any one of the position coordinates acquired in Step S110, the pressed-position acquiring section 74 calculates coordinates of the pressed position (S112). For example, when only one set of position coordinates are stored in the pressed position data, the pressed-position acquiring section 74 calculates position coordinates, midpoint coordinates between which and the position coordinates stored in the pressed position data are the position coordinates inputted from the touch panel section 56, as coordinates of the pressed position. Further, for example, when a plurality of position coordinates are stored in the pressed position data, the pressed-position acquiring section 74 calculates position coordinates, center of gravity coordinates of which, and the plurality of position coordinates stored in the pressed position data, are the position coordinates inputted from the touch panel section 56, as coordinates of the pressed position.

The pressed-position acquiring section 74 adds and stores the coordinates of the pressed position calculated in Step S112 in the pressed position data (S113). The processing executing section 76 acquires, based on the determination area table, an area ID of a determination area to which the coordinates of the pressed position calculated in Step S112 (more precisely, position coordinates on the game screen corresponding to the pressed position) belong (S114).

On the other hand, when it is judged in Step S108 that position coordinates are not stored in the pressed position data, the pressed-position acquiring section 74 adds and stores the input position coordinates in the pressed position data (S115). The processing executing section 76 acquires, based on the determination area table, an area ID of a determination area to which the input position coordinates (more precisely, position coordinates on the game screen corresponding to the input position coordinates) belong (S116).

Subsequently, the processing executing section 76 judges whether at least a part of an insect character image of an ID "n+1" is included in the determination area with the area ID acquired in Step S114 or S116 (S117). Specifically, the processing executing section 76 acquires display positions (positions of representative points) of the insect character image of the ID "n+1" based on the insect character table and acquires display areas of the insect character image of the ID "n+1". The processing executing section 76 judges whether at least a part of the display areas of the insect character image of the ID "n+1" are included in the determination area with the area ID acquired in Step S111 or S113.

When it is judged that all or a part of the insect character image of the ID "n+1" are not included in the determination area with the area ID acquired in the Step S114 or S116, the processing executing section 76 judges that capturing of an insect character has ended in failure and instructs the display control section 78 to display a game over screen on the display section 80 (S124). In this case, the display control section 78 generates a game over screen on the VRAM. The game over screen generated on the VRAM is displayed on the display section 80 at predetermined timing.

On the other hand, when it is judged that at least a part of the insect character image of the ID "n+1" is included in the determination area with the area ID acquired in Step S114 or S116, the processing executing section 76 updates the state flag fields of the insect character image of the ID "n+1" to "2" in the insect character table (S118).

The processing executing section 76 increments the captured number counter n (S119). The processing executing section 76 judges whether the captured number counter n is 5 (S120). When it is judged that the captured number counter n is 5, the processing executing section 76 instructs the display control section 78 to display a game clear screen on the display section 80 (S123). In this case, the display control section 78 generates a game clear screen in the VRAM. The game clear screen generated in the VRAM is displayed on the display section 80 at a predetermined timing. A message indicating that all the insect characters have been captured is displayed on the game clear screen. Time required for capturing all the insect characters is displayed. This time is calculated based on a value of the elapsed time counter t.

On the other hand, when it is judged that the captured counter n is not 5, the processing executing section 76 determines initial position coordinates and moving path of the insect character image of the ID "n+1" (S121). These are determined based on random numbers.

However, the initial position coordinates are determined such that positions on the game screen corresponding to the respective position coordinates stored in the pressed position data are not included in the display area of the insect character image. Alternatively, the initial position coordinates are determined such that all or a part of the insect character image is not included in areas on the game screen corresponding to the respective position coordinates stored in the pressed position data. An "area on the game screen corresponding to position coordinates" may be a determination area to which a position on the game screen corresponding to the position coordinates belongs or may be an area within a predetermined distance from the position on the game screen corresponding to the position coordinates.

When a plurality of position coordinates are stored in the pressed position data, the initial position coordinates are determined such that the midpoints or the centers of gravity of respective combinations of a plurality of position coordinates among the position coordinates stored in the pressed position data are not included in the display area of the insect character image. Alternatively, the initial position coordinates are determined such that all or a part of the insect character image is not included in areas on the game screen corresponding to position coordinates of the midpoints or the centers of gravity.

The moving path is determined such that positions on the game screen corresponding to the respective position coordinates stored in the pressed position data are not included in the display area of the insect character image while the insect character image moves along the moving path for a predetermined time. Alternatively, the moving path is determined such that all or a part of the display area of the insect character image is not included in the areas on the game screen corresponding to the respective position coordinates stored in the pressed position data while the insect character image moves along the moving path for the predetermined time.

When a plurality of position coordinates are stored in the pressed position data, the moving path is determined such that positions on the game screen corresponding to the midpoints or the centers of gravity of respective combinations of a plurality of position coordinates among the position coordinates stored in the pressed position data are not included in the display area of the insect character image while the insect character image moves along the moving path for the predetermined time. Alternatively, the moving path is determined such that all or a part of the display area of the insect character image is not included in areas on the game screen corresponding to position coordinates of the midpoints or the centers of gravity while the insect character image moves along the moving path for the predetermined time.

When it is judged in Step S107 that the input position coordinates from the touch panel section 56 have not changed, the display control section 78 judges whether position coordinates are stored in the pressed position data (S125). When it is judged that position coordinates are stored in the pressed position data, the display control section 78 judges whether the respective position coordinates stored in the pressed position data are included in the moving path of the insect character image of the ID "n+1" up to a point after the predetermined time (S126). In other words, the display control section 78 judges whether position coordinates on the game screen corresponding to the respective position coordinates stored in the pressed position data are included in the display area of the insect character image of the ID "n+1" while the insect character image of the ID "n+1" move from a present position along the moving path for the predetermined time. Alternatively, the display control section 78 judges whether all or a part of the display area of the insect character image of the ID "n+1" is included in areas on the game screen corresponding to the respective position coordinates stored in the pressed position data while the insect character image of the ID "n+1" moves from the present position along the moving path for the predetermined time.

When it is judged that the respective position coordinates stored in the pressed position data are not included in the moving path of the insect character image of the ID "n+1" up to the point after the predetermined time, the display control section 78 judges whether a plurality of position coordinates are stored in the pressed position data (S127). When it is judged that a plurality of position coordinates are stored in the pressed position data, the display control section 78 acquires the midpoints or the centers of gravity concerning respective combinations of a plurality of position coordinates among the position coordinates stored in the pressed position data (S128). The display control section 78 judges whether the midpoints or the centers of gravity calculated in Step S128 are included in the moving path of the insect character image of the ID "n+1" up to the point after the predetermined position (S129). This judgment is performed in the same manner as Step S126.

When it is judged in Step S126 that the respective position coordinates stored in the pressed position data are included in the moving path of the insect character image of the ID "n+1" up to the point after the predetermined time or when it is judged in Step S129 that the midpoints or the centers of gravity calculated in Step S128 are included in the moving path of the insect character image of the ID "n+1" up to the point after the predetermined time, the display control section 78 updates the moving path of the insect character image of the ID "n+1" (S130). In other words, the display control section 78 determines a moving path including no respective position coordinates stored in the pressed position data and/or the midpoints or the centers of gravity calculated in Step S128 as the moving path of the insect character image of the ID "n+1" based on random numbers. The display control section 78 updates the moving path field of the insect character table.

Thereafter, the display control section 78 calculates coordinates of a moving destination position of the insect character image of the ID "n+1" based on the position coordinates field and the moving path field of the insect character table. The display control section 78 updates the position coordinates field of the insect character table (S131).

When the processing in Steps S108 to S121 or the processing in Step S131 is completed, the display control section 78 generates a game screen in the VRAM based on the insect character table (S122). The game screen generated in the VRAM is outputted to the display section 80 at a predetermined timing.

The processing described above is realized when a game program supplied via the game cartridge 48 is executed by the microprocessor.

As described above, in the portable game machine 10, when one position is further pressed in the state in which a plurality of positions of the touch panel section 56 are pressed, coordinates of the position newly pressed is calculated based on coordinates of the plurality of positions originally pressed and position coordinates inputted from the touch panel. Thus, it is possible to realize a game with which the player plays by pressing a plurality of positions of the touch panel section 56. In particular, according to the portable game machine 10, it is possible to attain that coordinates of the midpoint or the center of gravity of the plurality of positions originally pressed and coordinates of the center of gravity after the new position is pressed are different. As a result, it is possible to attain that calculation of the coordinates of the newly pressed position is reliably performed.

The present invention is not limited to the embodiments described above.

For example, the display control section 78 may limit display positions of insect character images such that "the midpoint or the center of gravity of coordinates of positions pressed by the player (position coordinates stored in the pressed position data)" and "the midpoint or the center of gravity of the coordinates of the positions pressed by the player and the display positions of the insect character images" are apart from each other by a predetermined distance or more or do not belong to an identical determination area. Consequently, it is possible to ascertain that the midpoint or the center of gravity of the plurality of positions originally pressed and the midpoint or the center of gravity after the new position is pressed are apart from each other by the predetermined distance or more or do not belong to an identical determination area.

In the above description, a display position of only one insect character image is updated on the game screen. However, for example, display positions of a plurality of insect character images may be updated simultaneously. In other words, a state where a plurality of insect characters are moving around may be displayed on the game screen. In this case, when one insect character image among the plurality of insect character images is held, it may be judged whether a position on the game screen corresponding to the midpoint or the center of gravity of positions pressed by the player is included in display areas of the other insect character images among the plurality of insect character images. When position coordinates on the menu screen corresponding to the midpoint or the center of gravity are included in the display areas of the other insect character images, the display positions of the other insect character images may be updated to positions where the position coordinates on the menu screen corresponding to the midpoint or the center of gravity are not included in the display areas of the other insect character images.

Further, for example, it is also possible to apply the present invention to information processing devices other than the portable game machine 10. For example, it is also possible to apply the present invention to other information processing devices such as a game machine for home use, a game machine for commercial use, a cellular phone, a personal digital assistant (PDA), and a personal computer or the like. For example, it is also possible to apply the present invention to an information processing device that includes a touch panel and displays a menu screen including a plurality of icon images (position guiding images). In this case, when a position is further pressed in the state in which another position or a plurality of other positions on the touch panel are pressed, it may be judged whether position coordinates on the menu screen corresponding to the midpoint or the center of gravity of a plurality of positions pressed at that point are included in a display area of an icon image. When the position coordinates on the menu screen corresponding to the midpoint or the center of gravity are included in a display area of an icon image, a display position of the icon image may be updated to a position where the position coordinates on the menu screen corresponding to the midpoint or the center of gravity are not included in the display area of the icon image.

Still further, in the description given above, the programs are supplied to the portable game machine 10 from the game cartridge 48 serving as an information storage medium, and may also be distributed to homes and the like via the communication network. FIG. 16 is a diagram illustrating an overall structure of a program distribution system using the communication network. A program distribution method according to the present invention will be described with reference to FIG. 16. As illustrated in the figure, a program distribution system 100 includes a game database 102, a server 104, a communication network 106, and a portable game machine 108. A program distribution device 110 is constructed of the game database 102 and the server 104 among those components. The communication network 106 is built up by including, e.g., the Internet and a cable TV network. In this system, the game database (information storage medium) 102 is stored with programs having the same storage contents as those of the game cartridge 48. Then, a prospective consumer makes a game distribution request by use of the portable game machine 108, whereby the request is transferred to the server 104 via the communication network 106. Then, the server 104 reads the programs from the game database 102 in response to the game distribution request, and transmits the programs to the portable game machine 108 (the game distribution requester). Herein, the game is distributed in response to the game distribution request. However, the server 104 may transmit the game one-sidedly. Further, all of the required programs may not necessarily be distributed at one time (entire distribution) in order to actualize the game, and necessary program modules may also be distributed (partial distribution) corresponding to a stage of the game. Thus, the game is distributed via the communication network 106, whereby the prospective consumer can easily obtain the programs.

The invention claimed is:

1. An information processing device including:
a touch panel that outputs positional information corresponding to a position being pressed;
pressed-position acquiring means for acquiring a pressed position based on the positional information outputted from the touch panel; and
pressed-position-information storing means for storing pressed position information indicating the pressed position acquired by the pressed-position acquiring means, wherein:
the information processing device comprises:
displaying means for displaying a screen including one or a plurality of position guiding images;
display limiting means for limiting, when the pressed position information stored in the pressed-position-information storing means indicates a plurality of pressed positions, a display position of the position guiding image based on a position having a predetermined relation with the plurality of pressed positions; and
processing executing means for executing processing based on the pressed position acquired by the pressed-position acquiring means and the display position of the position guiding image; and
the pressed-position acquiring means acquires, when the pressed position information stored in the pressed-position-information storing means indicates one or a plurality of pressed positions, the pressed position further based on the one or the plurality of pressed positions.

2. An information processing device according to claim 1, wherein the display position of the position guiding image is limited such that a position on the screen corresponding to the position having the predetermined relation with the plurality of pressed positions indicated by the pressed position information is not included in the display area of the position guiding image.

3. An information processing device according to claim 1, wherein the display position of the position guiding image is limited such that at least part of the position guiding image is not included in an area on the screen corresponding to the position having the predetermined relation with the plurality of pressed positions indicated by the pressed position information.

4. An information processing device according to claim 1, wherein the position having the predetermined relation with the plurality of pressed positions indicated by the pressed position information comprises a center of gravity of the plurality of pressed positions indicated by the pressed position information.

5. A control method for an information processing device including a touch panel that outputs positional information corresponding to a position being pressed, comprising the steps of:
acquiring a pressed position based on the positional information outputted from the touch panel;
causing pressed-position-information storing means to store pressed position information indicating the pressed position acquired by the step acquiring a pressed position;
causing displaying means to display a screen including one or a plurality of position guiding images;
limiting a display position of the position guiding image based on a position having a predetermined relation with the plurality of pressed positions, when the pressed position information stored in the pressed-position-information storing means indicates a plurality of pressed positions; and
executing processing based on the pressed position acquired in the step of acquiring a pressed position and the display position of the position guiding image,
wherein the step of acquiring a pressed position includes acquiring the pressed position further based on the one or the plurality of pressed positions, when the pressed position information stored in the pressed-position-information storing means indicates one or a plurality of pressed positions.

6. A non-transitory computer-readable information storage medium having recorded thereon a program for causing a computer to function as an information processing device, the information processing device including:
  a touch panel that outputs positional information corresponding to a position being pressed;
  means for acquiring a pressed position based on the positional information outputted from the touch panel; and
  means for storing pressed position information indicating the pressed position acquired by the means for acquiring the pressed-position,
wherein:
  the program recorded on the computer-readable medium causes the computer to function as:
  means for displaying a screen including one or a plurality of position guiding images;
  means for limiting, when the pressed position information stored in the means for storing pressed-position-information indicates a plurality of pressed positions, a display position of the position guiding image based on a position having a relation with the plurality of pressed positions; and
  means for executing processing based on the pressed position acquired by the means for acquiring the pressed-position and the display position of the position guiding image;
  wherein the means for acquiring the pressed position acquires, when the pressed position information stored in the means for storing pressed-position-information indicates one or a plurality of pressed positions, the pressed position further based on the one or the plurality of pressed positions.

7. An information processing device according to claim 2, wherein the position having the predetermined relation with the plurality of pressed positions indicated by the pressed position information comprises a center of gravity of the plurality of pressed positions indicated by the pressed position information.

8. An information processing device according to claim 3, wherein the position having the predetermined relation with the plurality of pressed positions indicated by the pressed position information comprises a center of gravity of the plurality of pressed positions indicated by the pressed position information.

9. An information processing device including:
  a touch panel that outputs positional information corresponding to a position being pressed;
  a pressed-position acquiring section that acquires a pressed position based on the positional information outputted from the touch panel; and
  a main storage that stores pressed position information indicating the pressed position acquired by the pressed-position acquiring section, wherein:
  the information processing device comprising:
  a display section that displays a screen including at least one position guiding image;
  a display control section that limits, when the pressed position information indicates a plurality of pressed positions, a display position of the position guiding image based on a position having a predetermined relation with the plurality of pressed positions; and
  a processing executing section that executes processing based on the acquired pressed position and the display position of the position guiding image; and
  the pressed-position acquiring section acquires, when the pressed position information indicates one or a plurality of pressed positions, the pressed position further based on the one or the plurality of pressed positions.

* * * * *